US 8,070,364 B2

(12) United States Patent  (10) Patent No.: US 8,070,364 B2
Beer et al.  (45) Date of Patent: Dec. 6, 2011

(54) ROLLING BEARING OF CERAMIC AND STEEL ENGAGING PARTS

(75) Inventors: Oskar Beer, Landshut (DE); Franz-Josef Ebert, Hammelburg (DE); Gerhard Kreiselmeier, Dittelbrunn (DE); Edgar Streit, Poppenlauer (DE)

(73) Assignee: Schaeffler KG, Herzogenaurach (DE)

( * ) Notice: Subject to any disclaimer, the term of this patent is extended or adjusted under 35 U.S.C. 154(b) by 787 days.

(21) Appl. No.: 11/195,890

(22) Filed: Aug. 3, 2005

(65) Prior Publication Data

US 2006/0029318 A1  Feb. 9, 2006

Related U.S. Application Data

(60) Provisional application No. 60/598,784, filed on Aug. 4, 2004.

(51) Int. Cl.
 *F16C 33/62* (2006.01)
 *F16C 33/64* (2006.01)
(52) U.S. Cl. ....................................................... 384/492
(58) Field of Classification Search .................. 384/492, 384/569, 625, 912, 913; 29/898.13
 See application file for complete search history.

(56) References Cited

U.S. PATENT DOCUMENTS

| | | | |
|---|---|---|---|
| 1,982,421 A | 11/1934 | Simmons et al. | |
| 4,659,241 A * | 4/1987 | Bamberger et al. | 384/625 |
| 5,112,146 A * | 5/1992 | Stangeland | 384/492 |
| 5,147,140 A | 9/1992 | Murakami et al. | |
| 5,503,797 A | 4/1996 | Zoch et al. | |
| 5,522,667 A * | 6/1996 | Miyake | 384/492 |
| 5,560,787 A | 10/1996 | Takagi et al. | |
| 5,707,460 A | 1/1998 | Chaterjee | |
| 5,816,711 A * | 10/1998 | Gingrich | 384/488 |
| 5,851,313 A * | 12/1998 | Milam | 148/222 |
| 5,879,480 A | 3/1999 | Hetzner | 148/644 |
| 5,998,042 A | 12/1999 | Tanaka et al. | |
| 6,179,933 B1 * | 1/2001 | Dodd et al. | 148/222 |
| 6,248,186 B1 | 6/2001 | Yamamura et al. | 148/319 |
| 6,250,812 B1 * | 6/2001 | Ueda et al. | 384/492 |
| 6,290,398 B1 * | 9/2001 | Fujiwara et al. | 384/625 |
| 6,315,455 B1 * | 11/2001 | Tanaka et al. | 384/492 |
| 6,391,128 B2 * | 5/2002 | Ueda et al. | 148/669 |
| 6,443,624 B1 * | 9/2002 | Knepper et al. | 384/492 |
| 6,530,695 B2 * | 3/2003 | Kawamura et al. | 384/492 |
| 6,966,954 B2 * | 11/2005 | Rhoads et al. | 148/319 |
| 2003/0099416 A1 * | 5/2003 | Kinno et al. | 384/492 |
| 2004/0071379 A1 * | 4/2004 | Carrerot | 384/565 |

FOREIGN PATENT DOCUMENTS

| | | |
|---|---|---|
| DE | 10222266 | 4/2003 |
| EP | 0295111 | 12/1988 |
| EP | 0 739 994 A1 | 10/1996 |
| FR | 865.511 | 5/1941 |
| GB | 2 306 505 A | 5/1997 |

(Continued)

OTHER PUBLICATIONS

ASM International Handbook Committee, "ASM Handbook, vol. 04—Heat Treating," ASM International, Copyright 1991, p. 259-267.*

(Continued)

*Primary Examiner* — Thomas R Hannon
*Assistant Examiner* — Phillip A Johnson
(74) *Attorney, Agent, or Firm* — Lucas & Mercanti, LLP

(57) ABSTRACT

A roller bearing having two cooperating rolling parts of which one is of ceramic and the other of a steel. The steel part is of such structure and/or material and/or is so produced to cause residual compressive stresses to form beneath the contact surface of the steel part, at least in a load-free state, down to a depth.

11 Claims, 7 Drawing Sheets

FOREIGN PATENT DOCUMENTS

| | | |
|---|---|---|
| GB | 2291651 | 1/1998 |
| JP | 11071642 | 3/1999 |

OTHER PUBLICATIONS

Edgar Streit; Werner Trojahn, "Duplex Hardening for Aerospace Bearing Steels," Presented at 6th International ASTM Symposium on Bearing Steels; Phoenix, Arizona, USA, May 8-10, 2001.

William D. Callister, Jr., "Material Science and Engineering—An Introduction;" 6th Edition, pp. 321-325; John Wiley & Sons, Inc., U.S.A.

James M. O'Brien; "Plasma (Ion) Nitriding of Steels;" ASM Handbooks Online; (2002) ASM International.

"Vasco M-50" Alloy Digest; Engineering Alloys Digest, Inc., Upper Montclair, New Jersey, USA, Nov. 1974.

\* cited by examiner

ROLLING BEARING OF CERAMIC AND STEEL ENGAGING PARTS

CROSS REFERENCE TO RELATED APPLICATION

This application is based upon and claims benefit of U.S. Provisional Application 60/598,784, filed on Aug. 4, 2004, to which a claim of priority is hereby made.

FIELD OF THE INVENTION

The invention relates to a rolling bearing, having at least one first rolling part made from a ceramic material and having at least one second rolling part made from a steel.

BACKGROUND OF THE INVENTION

Accordingly, the invention relates to hybrid bearings. Hybrid bearings are rolling bearings which have bearing rings, or at least the raceways of the bearing rings, made from steel and which are provided with rolling bodies made from ceramic, or in which at least one bearing ring is made from ceramic and the rolling bodies are made from steel.

The materials used for the ceramic rolling bearing element are all industrial ceramics, in particular silicon nitride ($Si_3N_4$), but also silicon carbides and also aluminum and zinc oxides. The use, construction and advantages and disadvantages of using hybrid bearings are extensively described in the publication by FAG Kugelfischer Georg Schäfer KGaA, Publ. No. WL 40 204 DA 80/11 from 1990 "Hochleistungskeramik in FAG Wälzlagern" [High-performance ceramics in FAG roller bearings].

Excellent properties of ceramic for use as roller bearing material for roller bearing parts which are subject to high and extremely high loads include properties such as low weight, low thermal expansion, high hardness and heat resistance, good dimensional stability at extremely high temperatures, high chemical resistance and high corrosion resistance, high modulus of elasticity, lower frictional torque at high rotational speeds and lower heat production, lack of magnetism and insulator properties.

The centrifugal force of the rolling bodies should also be taken into account when determining the loads on fast-moving roller bearings. At very high rotational speeds, such as for example for applications in driving mechanisms, the centrifugal forces are generally even dominant over the bearing loads. On account of the low weight of ceramic, at high rotational speeds the centrifugal forces generated are lower at rolling bodies made from ceramic. The density of ceramic, for example silicon nitride, is only approx. 40% of the density of steel.

Ceramic materials have a significantly higher modulus of elasticity, for example 1.5 times, than steel. Consequently, for the same loading, the specific stress in the rolling contact is higher than with contact parts made from steel, since the pressure ellipse produced by the ceramic rolling bodies in the rolling contact is smaller. In general, therefore, rolling pairings in which both components are made from ceramic, and in particular rolling pairings in which one rolling part is made from steel and the other is made from ceramic, are not able to withstand as high a load as rolling pairings in which both contact parts are made from steel.

Components made from ceramic have a fundamentally different failure mechanism than components made from roller bearing steel. On account of the brittleness of the ceramic material, in the event of overloading, ceramic fractures without any significant plastic deformation. This property has caused the person skilled in the art to consider that in the event of damage to components made from ceramic, such as small pieces of the surface breaking off, in a roller bearing, the ceramic components will be the first to suffer extensive damage, and the steel components will only undergo such damage at a later stage, as a secondary phenomenon. However, as has emerged and as has also been described in the prior art cited above, under certain circumstances ceramic components which have suffered preliminary damage as a result of impurities and inclusions and pores, cracking nuclei and microcracks and overloading and/or as a result of foreign particles in the rolling contact, have initially proven to still have a long service life. The abrasion of the ceramic and/or particles which have broken out of the surface of the ceramic component in some cases act as an abrasive on the raceways made from steel or pass into the rolling contact, where they first of all damage outer layers of the rolling parts made from steel.

The sensitivity of the surfaces of the roller bearing parts made from steel is dependent on the nature and magnitude of the stresses prevailing at and below the surface (in the outer layer). In this context, the term nature is to be understood as meaning residual stresses (tensile or compressive stresses) in the outer layer of the component or stresses acting on the component as a result of external action. Tensile stresses at the surface and in the outer layer below the surface increase the sensitivity of the component. Tensile stresses of this type are caused on the one hand by the pretreatment (heat treatment and hard machining) of the component and by operating conditions to which the component is exposed. For example, at the outer raceway of an inner ring and at the edges, the residual tensile stresses are further intensified by tensile stresses from the required press fit of the inner ring, for example on a shaft. If this inner ring additionally rotates at high speeds, the tensile stresses may reach a level at which the susceptibility of the inner ring to failure is significantly increased. Locally high contact pressures caused by particles which have broken off from the ceramic components and entered the rolling contact may damage the outer layer of the raceways in such a way that microcracks are formed. These microcracks then propagate to produce pitting and further, extensive damage.

The hard and sharp edges of the possible break-out locations on the rolling part made from ceramic have similar effects on the rolling parts made from steel. These break-out locations cause the steel surface to be highly stressed as a result of abrasive wear. As a result, at high rotational speeds and loads, the rate at which damage progresses may be drastically increased.

The use of ceramic components having the materials problems described above has as far as possible been avoided by suitable testing, enabling defective parts of this type to be scrapped. However, the rolling contact is endangered, in particular in bearings which are greatly influenced by the surroundings, by foreign particles which pass into the rolling contact, for example together with the lubricant. Foreign particles of this type then likewise first of all cause destruction of rolling parts made from steel, in accordance with the mechanisms outlined above.

SUMMARY OF THE INVENTION

Therefore, the object of the invention is to provide a roller bearing which avoids the above-mentioned drawbacks.

According to the invention, this object is achieved by virtue of the fact that at the roller bearing, in which at least one first rolling part is made from a ceramic material and at least one second rolling part is made from a steel with a martensitic microstructure, at least one portion of the surface of the second rolling part, in a load-free state, has residual compressive stresses beneath the surface. The portion of the surface or, as in the case of balls, the entire surface is intended for rolling contact with the first, ceramic rolling part.

The residual compressive stresses, at least in the outer layer of the portion, are preferably produced by a thermochemical process in which the lower regions of the outer layer, at between 100 µm and 700 µm below the surface, may have residual compressive stresses, but even in the vicinity of the surface the residual compressive stresses are sufficiently high for it to be virtually impossible for them to be converted into the detrimental tensile stresses even under extreme operating conditions.

Residual compressive stresses of this type can be deliberately produced by mechanical or thermochemical means. Using the mechanical route, compressive stresses of this type are produced, for example, by shot peening. Shot peening compacts the microstructure at the surface of the machine component and thereby produces residual compressive stresses.

Therefore, on account of the values which have been set, the surface of the component according to the invention, even close to the surface, is relatively insensitive to high surface pressures and/or to notch effects and is therefore more suitable for a rolling pairing with components made from ceramic.

A further configuration of the invention provides for the outer layer to have a surface hardness of at least 850 HV0.3, but preferably a surface hardness of 900 HV0.3, at least at the portion, at a depth of 0.05 mm below the surface. The Vickers hardness is tested with a 0.3 kg load on the test pyramid (made from diamond).

According to one configuration of the invention, the level of the residual compressive stresses, down to a depth of ≦40 µm, is at least −300 MPa or below, i.e. for example −1000 MPa or less. Accordingly, the compressive stress as an absolute value (in accordance with the mathematical definition of the term value), at a depth down to 40 µm, corresponds to at least 300 MPa and above, for example 1200 MPa. This state is preferably formed by a thermochemical modification to at least the outer layer and at least in the portion for the rolling contact.

The roller bearing part=second rolling part is load-free if, produced as a finished component, it is, at least at the portion with the compressive stresses below the surface, still not exposed to any loads which alter or are superimposed on the nature and magnitude of the residual compressive stresses in accordance with the invention. The loads may be of kinematic or mechanical nature. Loads of this type result, for example, from the roller bearing part being installed in the surrounding structure, for example loads from a press fit on an inner ring of the roller bearing. Other loads are those to which the component is exposed in operation, such as for example centrifugal forces from rotation or pressures resulting from punctiform, linear or areal touching in sliding or rolling contact with other elements. Further examples of such loads include notch effects, bending, tension and compression.

The residual compressive stresses are formed at least in a portion below the surface of the bearing part which is intended for rolling pairing with at least one further rolling part. These residual compressive stresses in the microstructure of the steel are preferably, as has already been mentioned above, produced by means of a thermochemical heat treatment process in the outer layer. The entire surface or just a portion of the roller bearing part according to the invention are therefore relatively insensitive to high surface pressures and/or notch effects even close to the surface, on account of the values which are set. Examples of portions at surfaces include the edge zones of the raceways at bearing rings of a roller bearing or the edge zones at the bearing rings which are intended for radial guidance of a cage. One example of a machine element which has the residual compressive stresses according to the invention formed under its entire surface is the ball as a rolling body in a roller bearing.

One configuration of the invention provides for the residual compressive stresses to be formed in a fully machined outer layer. The term fully machined outer layer is to be understood as meaning, for example, the finish-ground and if appropriate honed raceway of the roller bearing or a surface of a rolling body which has been machined in this manner, for example the surface of a ball or that of a roll, or such as the raceways of a ball screw which has been machined in this or some similar way. The residual compressive stresses are formed, for example, in a nitrogen-enriched outer layer. This outer layer is produced by gas nitriding and preferably by plasma nitriding.

In a further configuration of the invention, the starting point is for the outer layer to be produced by what is known as double (duplex) hardening, i.e. first of all the steel is hardened, and then it is subjected to a further thermochemical heat treatment, in which the outer layer is formed. The hardening process is the standard process known to the person skilled in the art, in which the steel is austenitized, quenched and tempered. Therefore, the first heat treatment, which is characterized by known hardening and includes a tempering operation, is followed by a second heat treatment, which produces the compressive stresses in accordance with the invention. It is provided that the steel is a high-temperature steel, the microstructure of which permits a tempering temperature in the first hardening process of at least 400° C. Accordingly, the temperature used during the subsequent outer layer hardening is over 400° C., for example for plasma nitriding is in a range from 400° C. to 600° C. The tempering temperature used in the first hardening process is above the temperature which is employed for the nitriding of the outer layer.

Further configurations of the invention provide for the invention to be used for steels having the designations and minimum compositions listed below:

a. having the designation M50 (AMS 6491), comprising
0.8 to 0.85% by weight of C
4 to 4.25% by weight of Cr
4 to 4.5% by weight of Mo
0.15 to 0.35% by weight of Mn
0.1 to 0.25% by weight of Si
0.9 to 1.1% by weight of V
max. 0.015% by weight of P
max. 0.008% by weight of S
and comprising further alloying constituents and iron, as well as standard impurities.

b. having the designation M50NiL (AM6278), comprising:
0.11 to 0.15% by weight of C
4.0 to 4.25% by weight of Cr
4.0 to 4.5% by weight of Mo
1.1 to 1.3% by weight of V
3.2 to 3.6% by weight of Ni
0.15 to 0.35% by weight of Mn
0.1 to 0.25% by weight of Si
max. 0.015% by weight of P
max. 0.008% by weight of S
and comprising further alloying constituents and iron, as well as standard impurities.

c. having the designation 32CD V13 (AMS6481), at least comprising:
  0.29 to 0.36% by weight of C
  2.8 to 3.3% by weight of Cr
  0.7 to 1.2% by weight of Mo
  0.15 to 0.35% by weight of V
  0.4 to 0.7% by weight of Mn
  0.1 to 0.4% by weight of Si
  max. 0.025% by weight of P
  max. 0.02% by weight of S
and comprising further alloying constituents and iron, as well as standard impurities.

d. having the designation T1 (S 18-0-1), comprising:
  0.7 to 0.8% by weight of C
  4 to 5% by weight of Cr
  17.5 to 18.5% by weight of Wo
  1 to 1.5% by weight of V
  0 to 0.4% by weight of Mn
  0.15 to 0.35% by weight of Si
  max. 0.025% by weight of P
  max. 0.008% by weight of S
and comprising further alloying constituents and iron, as well as standard impurities.

e. having the designation RBD, comprising:
  0.17 to 0.21% by weight of C
  2.75 to 3.25% by weight of Cr
  9.5 to 10.5% by weight of Wo
  0.2 to 0.4% by weight of Mn
  0 to 0.35% by weight of Si
  0.35 to 0.5% by weight of V
  max. 0.015% by weight of P
  max. 0.015% by weight of S
and comprising further alloying constituents and iron, as well as standard impurities.

f. having the designation Pyrowear 675 (AMS5930), comprising:
  0.06 to 0.08% by weight of C
  12.8 to 13.3% by weight of Cr
  1.5 to 2.0% by weight of Mo
  0.5 to 0.7% by weight of V
  2.2 to 2.8% by weight of Ni
  4.8 to 5.8% by weight of Co
  0.5 to 1.0% by weight of Mn
  0.2 to 0.6% by weight of Si
and comprising further alloying constituents and iron, as well as standard impurities.

The invention relates to roller bearing parts which are exposed to a rolling load in at least one pairing with a further roller bearing part or in contact with a plurality of rolling parts. The term rolling load also represents the generally undesirable sliding pairings, such as slipping, which may occur from time to time between the rolling parts. The rolling load is generated between the rolling parts as a result of the individual rolling parts rolling along one another. Rolling parts of this type are inner and outer rings and rolling bodies (balls and rolls). In particular for use in bearings for the aeronautical and aerospace industries, there is provision for one or more elements of the roller bearing to be combined with the compressive stresses in accordance with the invention.

The elements of the pairings have different materials from element to element as alternatives. For example, there is provision for an inner ring made from steel which is provided with the compressive stresses to be paired with rolling bodies (for example balls) made from suitable ceramic materials, such as Si3N4, or for one or two or more roller bearing rings made from ceramic to be paired with corresponding balls made from steel.

Alternatively, there is also provision for pairings of roller bearing parts which, in addition to the above-mentioned pairings, also form one or more pairings with elements made from the same material but of which at least one element includes the compressive stresses in accordance with the invention resulting from a thermochemical treatment, and at least one of the elements either does or does not include these compressive stresses. This is the case, for example, if rolling bodies made from steel and rolling bodies made from ceramic are simultaneously incorporated in a roller bearing. This also results in pairings in which at least two or more paired parts made from steel, of which, in addition, at least one is paired with the roller bearing part made from ceramic, have the compressive stresses in accordance with the invention and are made from identical or different steel grades. Therefore, the invention also applies to a roller bearing in which both at least one of the bearing rings and at least some of the rolling bodies made from steel have the residual compressive stresses resulting from a thermochemical treatment. In this case, it is possible for the bearing rings to be made from a steel of a composition which is identical to or different than that of the rolling bodies made from steel and for just one of the steel-on-steel parts to have the compressive stresses.

Other features and advantages of the present invention will become apparent from the following description of the invention which refers to the accompanying drawings.

The invention is explained in more detail below on the basis of an exemplary embodiment and on the basis of in-house test and calculation results.

DESCRIPTION OF A PREFERRED EMBODIMENT

Figure 1:
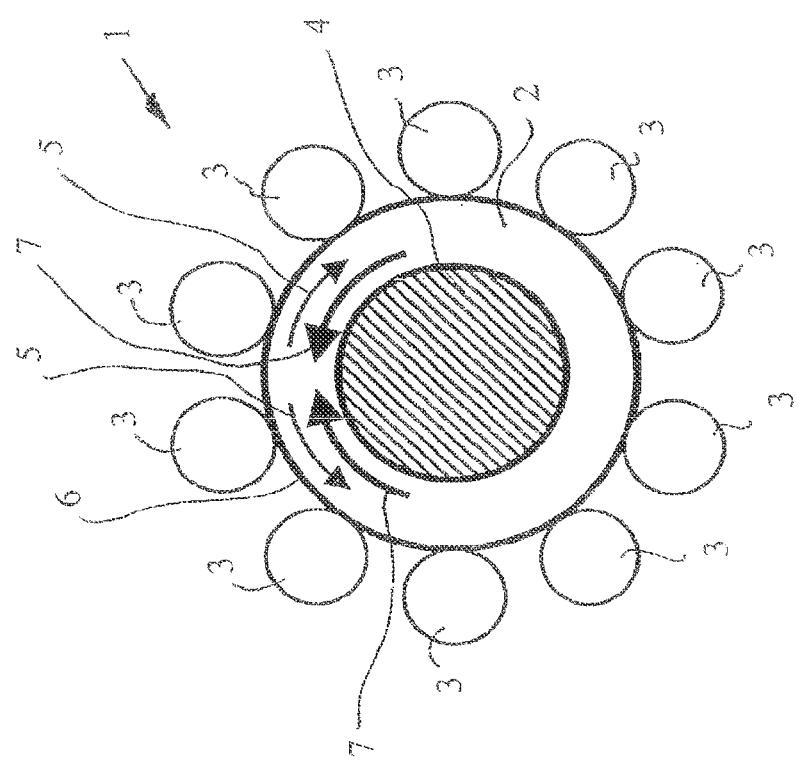
FIG. 1 shows a diagrammatic and highly simplified illustration of a roller bearing with which the invention is realized.

FIG. 1 shows, as an exemplary embodiment of the invention, a roller bearing 1 comprising an inner ring 2 and rolling bodies 3 in the form of balls. The balls are made from ceramic. The balls and the inner ring 2 form the rolling parts. The inner ring 2 is seated with a press fit on a shaft 4. The shaft 4 rotates at high rotational speeds in the clockwise or counterclockwise direction as desired. The forces from the press fit and the centrifugal forces from the rotation generate tensile stresses 5 (circumferential stresses) in the outer layer 6 of the inner ring 2. At the unfitted ring, the microstructure of the outer layer 6 has residual compressive stresses 7 which are superimposed in opposing fashion on the tensile stresses 5 and compensate for the latter on account of their greater magnitude and their opposite direction of action to the tensile stresses.

Figure 2:
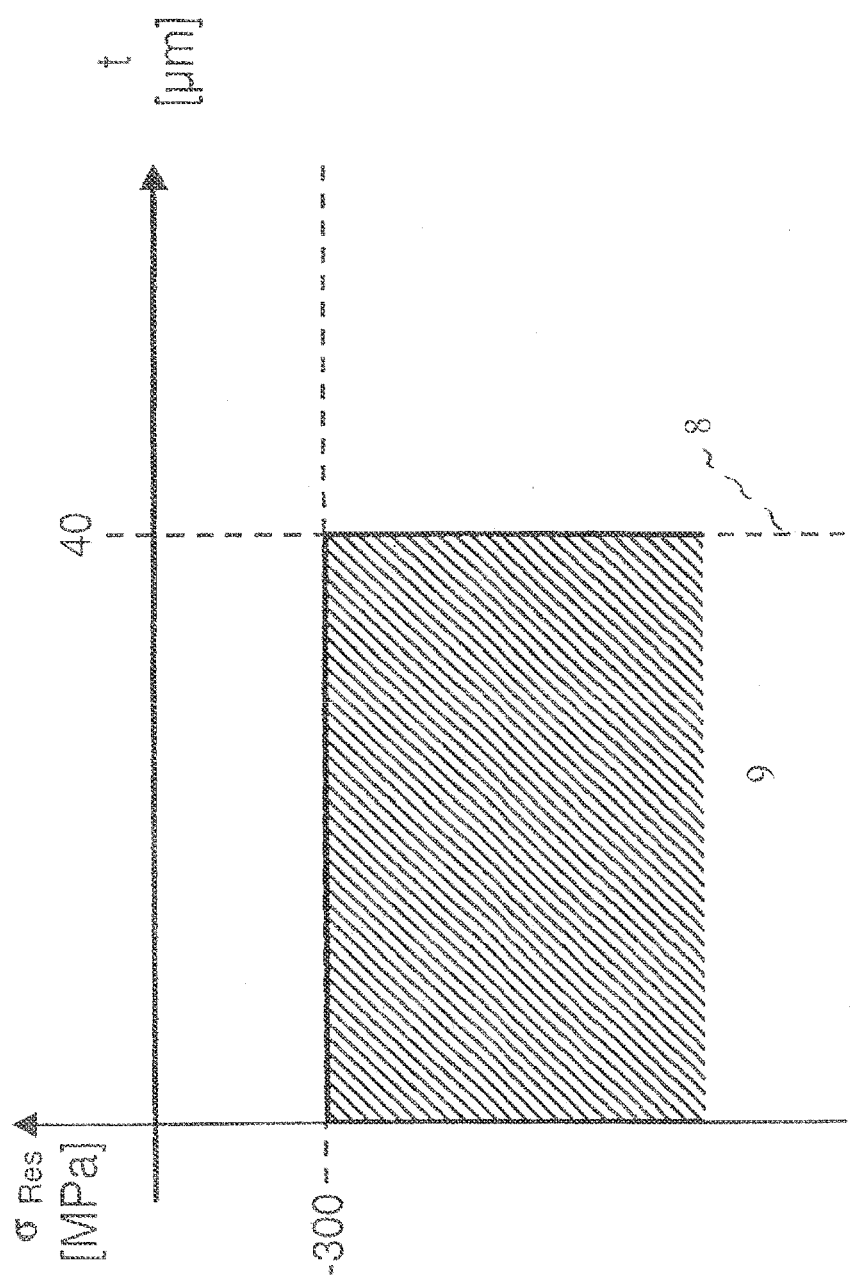
FIG. 2 shows, in diagram form, the region close to the surface in which the residual compressive stresses in accordance with the invention are formed.

FIG. 2 shows the results of the invention in diagram form. The residual compressive stresses ores in MPa for a load-free outer layer are illustrated as a function of the depth t of the outer layer in μm. The residual compressive stresses $\sigma_{res}$ prevail at least beneath a portion of the surface of a bearing ring or of a rolling body which is intended for rolling loading. The abscissa of the diagram stands for the outer layer depth t in micrometers. The ordinate in the Figure beneath the abscissa represents the compressive stresses, which are provided with a negative sign and result from tension and compression (in megapascals) in the outer layer. The further continuation of the ordinate in the Figure above the abscissa, in the direction indicated by the arrow, represents the tensile stresses, which are provided with a positive sign and are inherently disadvantageous. The line 8 marks the distance of 40 μm from the surface, up to which distance the residual compressive stresses $\sigma_{res}$ have a maximum value of −300 and below. The positive value of the compressive stresses resulting from the value of the residual compressive stresses is accordingly 300 MPa and more, e.g. even 1000 to 1200 Mpa.

Figure 3:
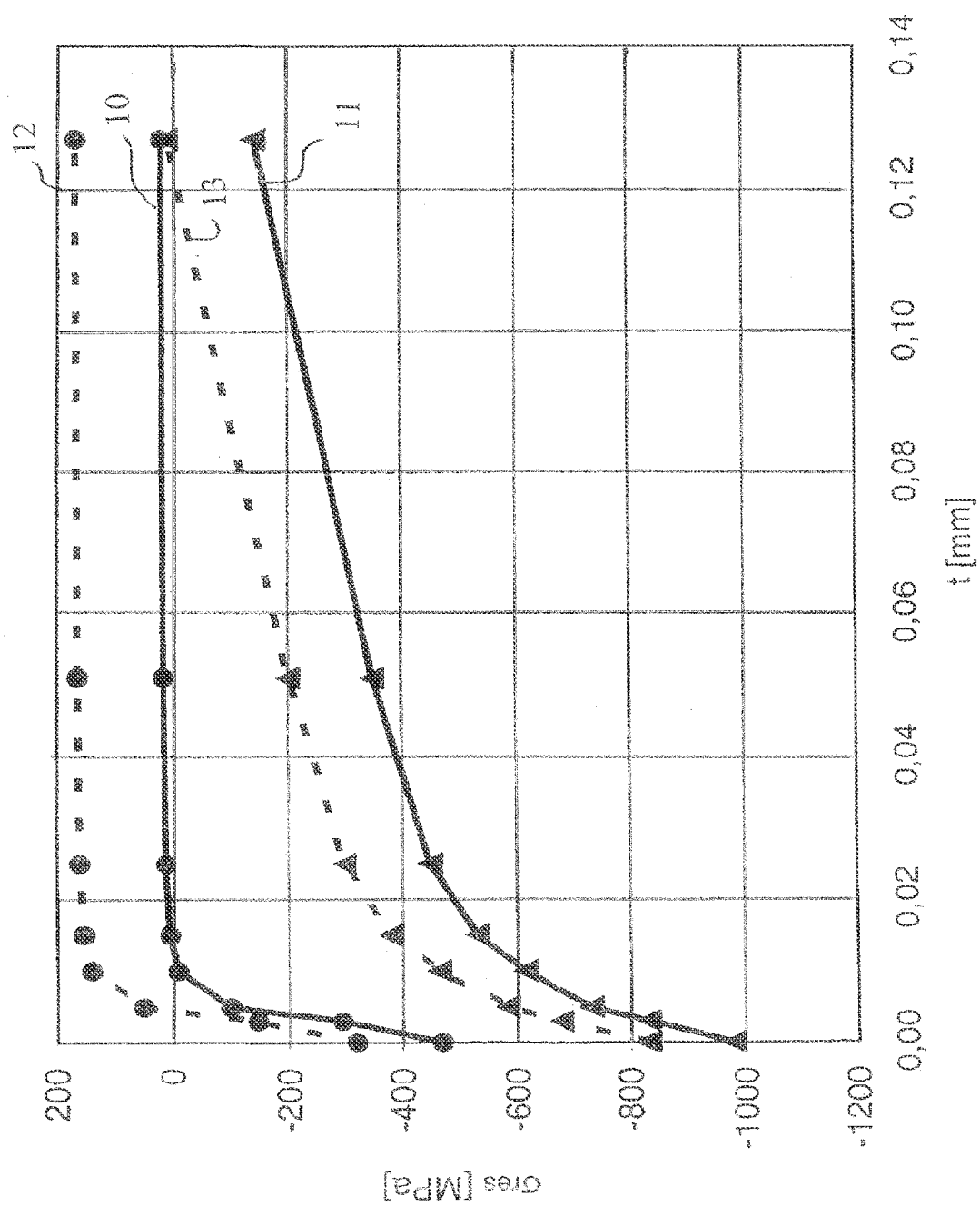
FIG. 3 illustrates measurement and calculation results in diagram form relating to stresses beneath the surface of single-hardened steel of grade M50 by comparison with double-hardened steel of grade M50.

FIG. 3 shows the curve for residual compressive stresses $\sigma_{res}$ in MPa in an outer layer as a function of the distance t (in μm) from the surface. The abscissa of the diagram also represents the layer depth t, starting from the outer surface, in micrometers, and the ordinate represents the resulting stresses in megapascals in the layer. The area in the Figure above the stresses $\sigma_{res}$=0 represents the tensile stresses, which are provided with a positive sign and are inherently disadvantageous, while the area below $\sigma_{res}$=0 represents the compressive stresses, which are provided with a negative sign.

First of all, lines 10 and 11 compare the curves of the residual stresses in load-free outer layers for roller bearing components made from steel grade M50 without the outer layer which has been modified in accordance with the invention and for a component made from steel grade M50DH. The curves for the load-free states are marked by solid lines for both steel grades. Line 10 shows the curve for the stresses for steel M50, and line 11 shows the curve for steel M50DH. The letters DH at the end stand for double hardening and indicate a component in which residual compressive stresses have been produced by thermochemical means in the vicinity of the surface in accordance with the invention. This is then followed by a comparison of the curves of the stresses, illustrated by dashed lines 12 and 13, for the same outer layers as those mentioned above, but in this case under load.

In the load-free state, the outer zone of the component made from M50 initially, down to a depth of approx. t=0.08-0.01 mm below the surface, has residual compressive stresses which are approx. −500 MPa at the surface and then move toward zero at 0.08-0.01 mm. As the depth t increases beyond 0.01, to a depth t of 0.12 mm, the line 10 moves in a range in which, apart from a somewhat negligible tendency toward tensile stresses, there are virtually no positive or negative residual stresses.

By contrast, the outer zone of the component made from M50DH has the residual compressive stresses, originating from the thermochemical treatment, in accordance with the invention. The curve of these stresses is illustrated from the value −1000 MPa at the surface to approx. −180 MPa at a depth t of approx. 0.12 mm below the surface, by line 11.

The stress curves for the same components or outer zones, but this time under load, are illustrated by dashed lines 12 and 13 in FIG. 3. Loads on the components are those which cause tensile stresses at least in the outer zone region under consideration. As is described below, these tensile stresses can be superimposed on the residual compressive stresses in such a way that the residual compressive stresses are reduced or compensated for by the operating tensile stresses or are moderately exceeded by the tensile stresses. According to the results illustrated in FIG. 3, the loads are characterized by a shift in the stresses toward the positive stress range of 150 MPa over the entire curve (circumferential stresses of 150 MPa resulting from press fit and centrifugal force).

In the loaded state, the outer zone of the component made from M50 (line 12) initially still has residual compressive stresses of approx. −320 MPa at the surface, but these have been canceled out by tensile stresses at a depth of just 0.003-0.005 mm. At a distance of greater than 0.003 to 0.005 mm from the surface and below, the outer layer has tensile stresses. As the depth t increases from 0.01 down to a depth t of 0.12 mm, the outer zone of the component made from M50 is under threat from virtually constant tensile stresses in the vicinity of +200 Mpa.

In the loaded state, the outer zone of the component made from M50DH with compressive stresses in accordance with the invention (line 13) has residual compressive stresses of approx. −820 MPa at the surface, and these are only canceled out by tensile stresses at a depth of 0.12 mm. On account of the high levels of residual compressive stresses produced by thermochemical treatment at a relevant depth, the outer layer cannot see its residual compressive stresses exceeded by the tensile stresses resulting from loads, and is therefore less at risk.

Figure 4:
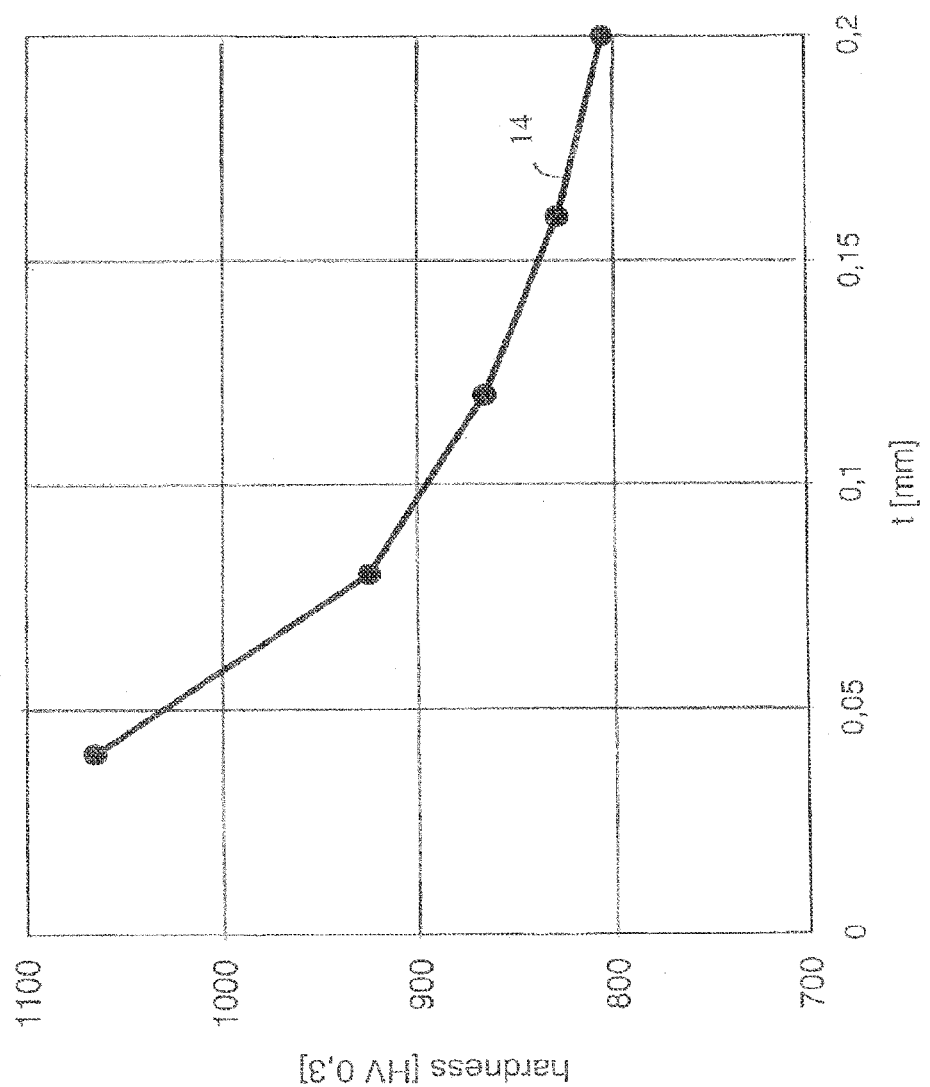
FIG. 4 shows, in diagram form, the hardness curve in the vicinity of the surface for a roller bearing component according to the invention made from double-hardened steel M50.

Line 14 in FIG. 4 illustrates the hardness curve in the outer layer of a DH-treated roller bearing component as described in FIG. 3. The outer zone of the component made from M50DH with compressive stresses in accordance with the invention (lines 11 and 13) has a hardness of over 1000 HV0.3 at a depth of 0.05 mm below the surface and of 800 HV0.3 even at a depth of 0.2 mm.

Figure 5:
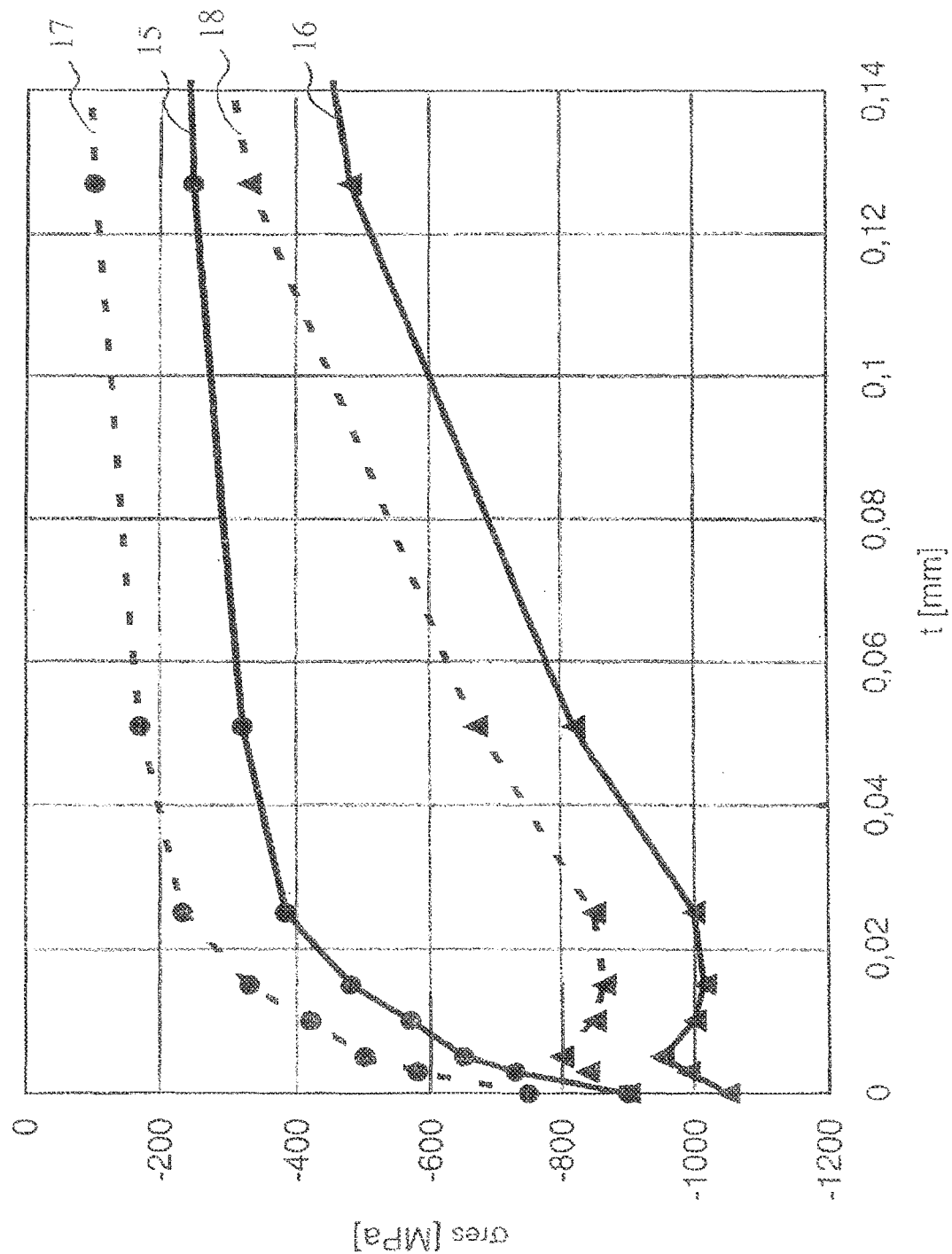
FIG. 5 illustrates the measurement and calculation results in diagram form relating to stresses beneath the surface of single-hardened steel of grade M50NiL by comparison with double-hardened steel of grade M50NiL.

FIG. 5 shows the curve for residual compressive stresses $\sigma_{res}$ in MPa in an outer layer as a function of the distance t (in μm) from the surface. The abscissa of the diagram also represents the layer depth t, starting from the surface, in micrometers, and the ordinate represents the resulting stresses in megapascals in the layer. The area below $\sigma_{res}$=0 represents the compressive stresses, which are provided with a negative sign.

Lines 15 and 16 compare the curves of the residual stresses of load-free outer layers for roller bearing components made from steel grade M50 NiL, without the outer layer which has been modified in accordance with the invention, and for a component made from steel grade M50 NiLDH. The curves for the load-free states are indicated by solid lines for both steel grades. Line 15 shows the curve for the stresses for steel M50 NiL, and line 16 shows the curve for the steel M50 NiLDH. The letters DH at the end stand for double hardening. This is followed by a comparison of the curves, illustrated by dashed lines 17 and 18, of the stresses in the same outer layers, but under load. Line 17 shows the curve for the stresses for steel M50 NiL, and line 18 shows the curve for steel M50 NiLDH with the outer layer under load.

FIG. 5 describes an exemplary embodiment of the invention in which a material which already had relatively good stress profiles and states in the outer layer was nevertheless improved still further by means of the invention.

In the load-free state and in the loaded state, the outer zone of the component made from M50 NiL has residual compressive stresses beneath the surface. The same is true of the component made from M50 NiLDH. However, the magnitudes of the residual compressive stresses of the component made from M50 NiLDH are significantly higher—at a depth of 0.02 mm below the surface, the difference between the residual compressive stress for the component made from M50 NiLDH (line 18) and the residual compressive stress for the component made from M50 NiL (line 17) is approx. 550 MPa. Therefore, in this case too, the double-hardened component can be subjected to high loads. As the depth of the outer layer increases, this difference drops, but is still over 200 MPa at a depth t of 0.12 mm. As is also the case in the results illustrated in FIG. 3, the loads are characterized by a shift in the stresses toward the positive stress range of 150 MPa over the entire curve (circumferential stresses of 150 MPa resulting from press fit and centrifugal force).

Figure 6:
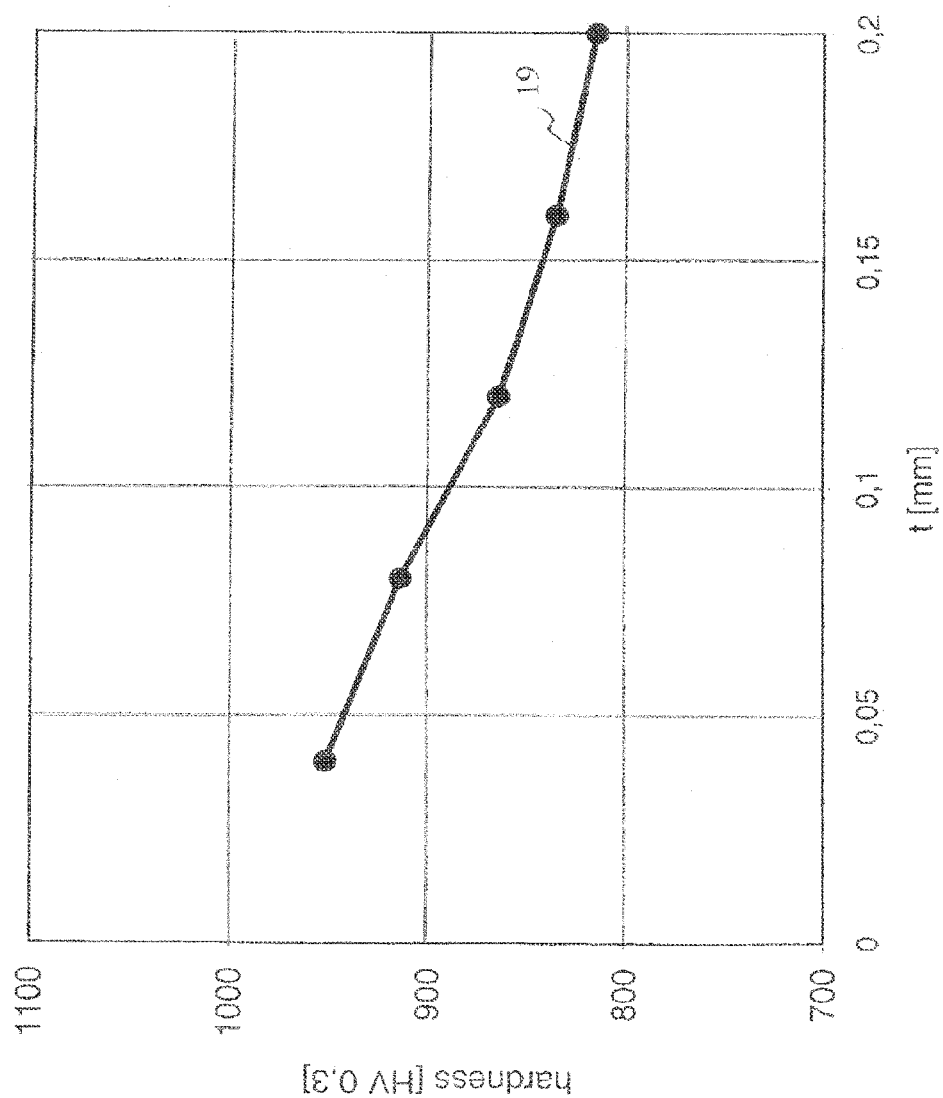
FIG. 6 shows the hardness curve in the vicinity of the surface for a roller bearing component according to the invention made from double-hardened steel M50NiL.

Line 19 in FIG. 6 illustrates the possible curve for the hardness in the outer layer of a roller bearing component according to the invention as has been described, for example, in FIG. 5. The outer zone of the component made from M50 NiLDH with compressive stresses in accordance with the invention (lines 16 and 18) has a hardness of over 900 HV0.3 at a depth of 0.05 mm below the surface, and a hardness of still over 800 HV0.3 at a depth of 0.2 mm.

Figure 7:
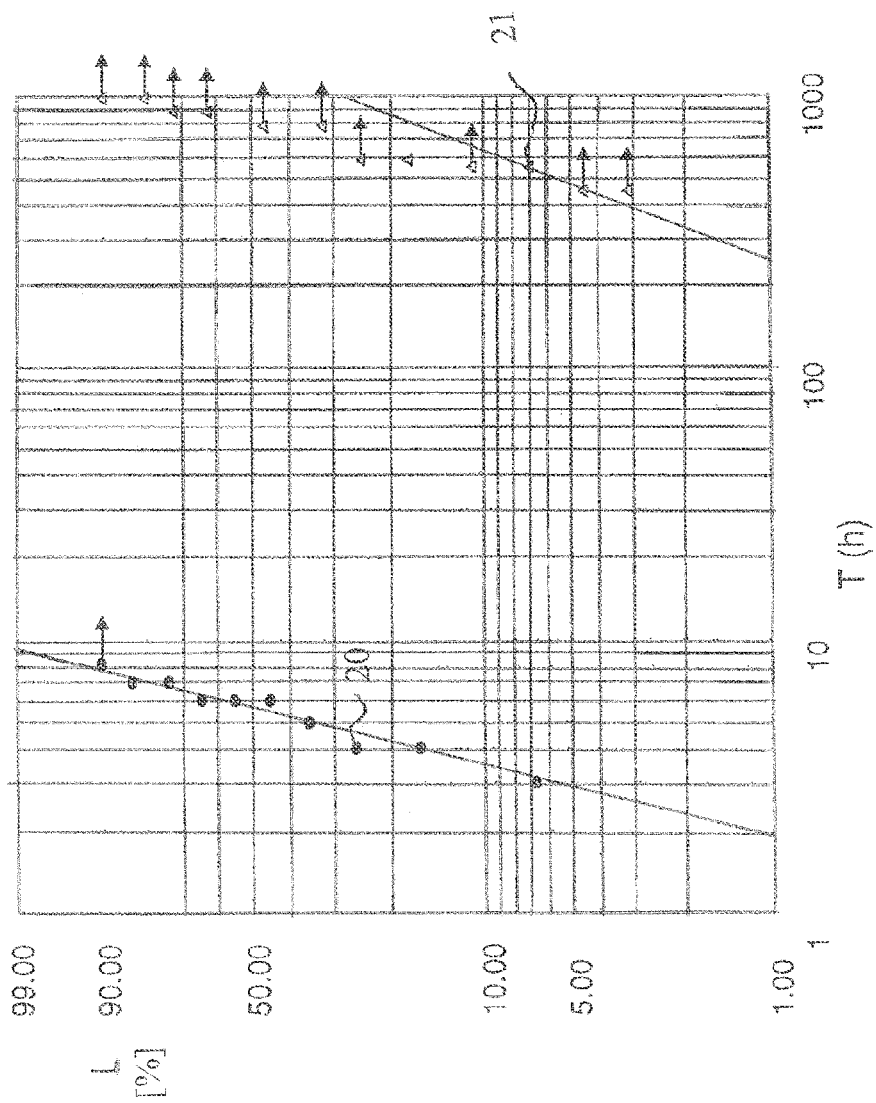
FIG. 7 is a chart comparing service life tests for different bearings, including a bearing of the invention.

FIG. 7 shows a diagram comparing the results 20 of service life tests for a bearing made from M50 and having rolling bodies made from steel, referred to below as a standard bearing, and the results 21 of a hybrid bearing with double-hardened running rings made from M50DH and having rolling bodies made from ceramic. The measurement results 20 for the standard bearings are illustrated in dot form, while the measurement results 21 for the hybrid bearing are illustrated in the form of triangles. The horizontally directed arrows leading from the measurement results 20, 21 mark the specimens which had still not failed over the course of the running time T used in the diagram.

The test was carried out under the following conditions: axial load 4.1 kN as loading at a temperature of approx. 120° C. in engine oil, which had been highly contaminated through use, for diesel engines at $P_{0.1R}$ of 2300 MPa for the steel balls and at $P_{0.1R}$ of 2600 MPa for the balls made from ceramic. It can be seen that for a failure probability L of 10% ($L_{10}$), the test specimens of the hybrid bearings according to the invention achieved a running time T in hours which was approximately 180 times or more that of the test specimens from standard bearings.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A roller bearing comprising:
   at least one first rolling part of a ceramic material having a first contact surface;
   at least one second cooperating rolling part comprising steel with a martensitic microstructure and having a second contact surface, at least a portion of the second contact surface configured and positioned to make rolling contact with the first surface; and
   the microstructure having residual compressive stresses beneath at least a portion of the second contact surface at least in a load-free state,
   wherein a level of the residual compressive stresses of an entire region starting from the second surface down to a depth of 40 μm corresponds at least to an absolute value of 300 MPa, wherein the residual stresses decrease in magnitude below the depth of 40 μm, and
   wherein the second rolling part includes a thermochemically produced outer layer to include the second contact surface, and the second contact surface is fully machined, wherein the thermochemically produced outer layer is nitrogen-enriched, wherein the outer layer of the second rolling part, at least at the second surface, has a hardness of at least 850 HV0.3 at a depth of 0.05 mm below the second surface, wherein the outer layer has been heat-treated twice, and the second heat treatment is at a process temperature of at least 400° C.

2. The roller bearing as claimed in claim 1, wherein the thermochemically produced outer layer is produced by plasma nitriding.

3. The roller bearing as claimed in claim 1, wherein the second rolling part comprises steel of designation M50, comprising:
   0.8 to 0.85% by weight of carbon,
   4 to 4.25% by weight of chromium,
   4 to 4.5% by weight of molybdenum,
   0.9 to 1.1% by weight of vanadium,
   0.15 to 0.35% by weight of manganese,
   0.1 to 0.25% by weight of silicon,
   maximum 0.015% by weight of phosphorus, and
   maximum 0.008% by weight of sulfur.

4. The roller bearing as claimed in claim 1, wherein the second rolling part comprises steel of designation M50NiL, comprising:
   0.11 to 0.15% by weight of carbon,
   4.0 to 4.25% by weight of chromium,
   4.0 to 4.5% by weight of molybdenum,
   1.1 to 1.3% by weight of vanadium,
   3.2 to 3.6% by weight of nickel,
   0.15 to 0.35% by weight of manganese,
   0.1 to 0.25% by weight of silicon,
   maximum 0.015% by weight of phosphorus, and
   maximum 0.008% by weight of sulfur.

5. The roller bearing as claimed in claim 1, wherein the second rolling part comprises steel of designation 32CDV13, comprising:
   0.29 to 0.36% by weight of carbon,
   2.8 to 3.3% by weight of chromium,
   0.7 to 1.2% by weight of molybdenum,
   0.15 to 0.35% by weight of vanadium,
   0.4 to 0.7% by weight of manganese,
   0.1 to 0.4% by weight of silicon,
   maximum 0.025% by weight of phosphorus, and
   maximum 0.02% by weight of sulfur.

6. The roller bearing as claimed in claim 1, wherein the second rolling part comprises steel of designation T1 (S 18-0-1), comprising:
   0.7 to 0.8% by weight of carbon,
   4 to 5% by weight of chromium,
   17.5 to 18.5% by weight of tungsten,
   1 to 1.5% by weight of vanadium,
   0 to 0.4% by weight of manganese,
   0.15 to 0.35% by weight of silicon, maximum 0.025% by weight of phosphorus, and
maximum 0.008% by weight of sulfur.

7. The roller bearing as claimed in claim 1, wherein the second rolling part comprises steel of designation RBD, comprising:
- 0.17 to 0.21% by weight of carbon,
- 2.75 to 3.25% by weight of chromium,
- 9.5 to 10.5% by weight of tungsten,
- 0.2 to 0.4% by weight of manganese,
- 0 to 0.35% by weight of silicon,
- 0.35 to 0.5% by weight of vanadium,
- maximum 0.015% by weight of phosphorus, and
- maximum 0.015% by weight of sulfur.

8. The roller bearing as claimed in claim 1, wherein the second rolling part comprises steel comprising:
- 0.06 to 0.08% by weight of carbon,
- 12.8 to 13.3% by weight of chromium,
- 1.5 to 2.0% by weight of molybdenum,
- 0.5 to 0.7% by weight of vanadium,
- 2.2 to 2.8% by weight of nickel,
- 4.8 to 5.8% by weight of cobalt,
- 0.5 to 1.0% by weight of manganese, and
- 0.2 to 0.6% by weight of silicon.

9. The roller bearing as claimed in claim 1, wherein the first rolling part comprises silicon nitride.

10. The roller bearing as claimed in claim 1, wherein the second rolling part is a bearing ring.

11. The roller bearing as claimed in claim 1, wherein the second rolling part is at least one rolling body.

* * * * *